US012377349B2

(12) United States Patent
Takura et al.

(10) Patent No.: US 12,377,349 B2
(45) Date of Patent: Aug. 5, 2025

(54) INFORMATION PROCESSING APPARATUS AND INFORMATION PROCESSING METHOD

(71) Applicant: SONY GROUP CORPORATION, Tokyo (JP)

(72) Inventors: Kento Takura, Tokyo (JP); Motoki Sasaki, Tokyo (JP); Kumiko Tsukahara, Tokyo (JP); Fumihiko Nishio, Tokyo (JP); Hyumin Seul, Tokyo (JP); Sho Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 698 days.

(21) Appl. No.: 17/430,974

(22) PCT Filed: Feb. 22, 2019

(86) PCT No.: PCT/JP2019/006909
§ 371 (c)(1),
(2) Date: Aug. 13, 2021

(87) PCT Pub. No.: WO2020/170453
PCT Pub. Date: Aug. 27, 2020

(65) Prior Publication Data
US 2022/0134226 A1    May 5, 2022

(51) Int. Cl.
*G06F 3/04817* (2022.01)
*A63F 13/537* (2014.01)
(Continued)

(52) U.S. Cl.
CPC ........ *A63F 13/537* (2014.09); *G06F 3/04817* (2013.01); *G06F 3/0482* (2013.01);
(Continued)

(58) Field of Classification Search
CPC .. A63F 13/537; G06F 3/04817; G06F 3/0482; G06F 3/165; G06F 3/0481;
(Continued)

(56) References Cited

U.S. PATENT DOCUMENTS

| 2007/0094597 A1* | 4/2007 | Rostom | G06F 9/452 |
| | | | 715/700 |
| 2014/0123183 A1 | 5/2014 | Fujimoto | |

(Continued)

FOREIGN PATENT DOCUMENTS

| CN | 104281408 A | 1/2015 |
| CN | 104756513 A | 7/2015 |

(Continued)

OTHER PUBLICATIONS

International Search Report and Written Opinion of PCT Application No. PCT/JP2019/006909, issued on May 21, 2019, 10 pages of ISRWO.

*Primary Examiner* — Peter J Iannuzzi
(74) *Attorney, Agent, or Firm* — CHIP LAW GROUP

(57) ABSTRACT

To provide an extension function that permits more intuitive operations without interfering with the behavior of an external application. There is provided an information processing apparatus that includes a controller configured to control functional extension of an external application. The controller causes an extended menu icon whose display position is adjustable to be superimposed and displayed on a display window of the external application, and controls a display position of an extended menu according to the display position of the extended menu icon. The controller causes an extension function icon to be superimposed and displayed on the display window with a display position of the extension function icon being adjustable, the extension function icon being associated with an extension function selected on the extended menu, and controls a display (Continued)

position of a sub-icon accompanying the extension function icon, according to the display position of the extension function icon.

11 Claims, 9 Drawing Sheets

(51) Int. Cl.
*G06F 3/0482* (2013.01)
*G06F 3/16* (2006.01)
*H04N 5/76* (2006.01)
*H04N 23/63* (2023.01)

(52) U.S. Cl.
CPC .............. *G06F 3/165* (2013.01); *H04N 5/76* (2013.01); *H04N 23/632* (2023.01)

(58) Field of Classification Search
CPC ....... G06F 2203/04804; G06F 3/04847; G06F 3/0486; G06F 3/0488; H04N 5/76; H04N 23/632

See application file for complete search history.

(56) References Cited

U.S. PATENT DOCUMENTS

| | | | |
|---|---|---|---|
| 2015/0281296 A1 | 10/2015 | Takaichi et al. | |
| 2017/0262156 A1 | 9/2017 | Xing | |
| 2017/0300187 A1 | 10/2017 | Lee et al. | |
| 2018/0122419 A1* | 5/2018 | Wayans | H04N 5/77 |
| 2021/0286491 A1* | 9/2021 | Duan | G06F 3/0485 |

FOREIGN PATENT DOCUMENTS

| | | | |
|---|---|---|---|
| CN | 105183442 A | 12/2015 | |
| CN | 105208239 A | 12/2015 | |
| CN | 105359078 A | 2/2016 | |
| CN | 107219980 A | 9/2017 | |
| CN | 107301038 A | 10/2017 | |
| JP | 2004-038895 A | 2/2004 | |
| JP | 2013-045190 A | 3/2013 | |
| JP | 2017-188833 A | 10/2017 | |
| JP | 2017-191589 A | 10/2017 | |
| JP | 2018-113514 A | 7/2018 | |
| KR | 10-2017-0118593 A | 10/2017 | |
| WO | 2014/068806 A1 | 5/2014 | |

* cited by examiner

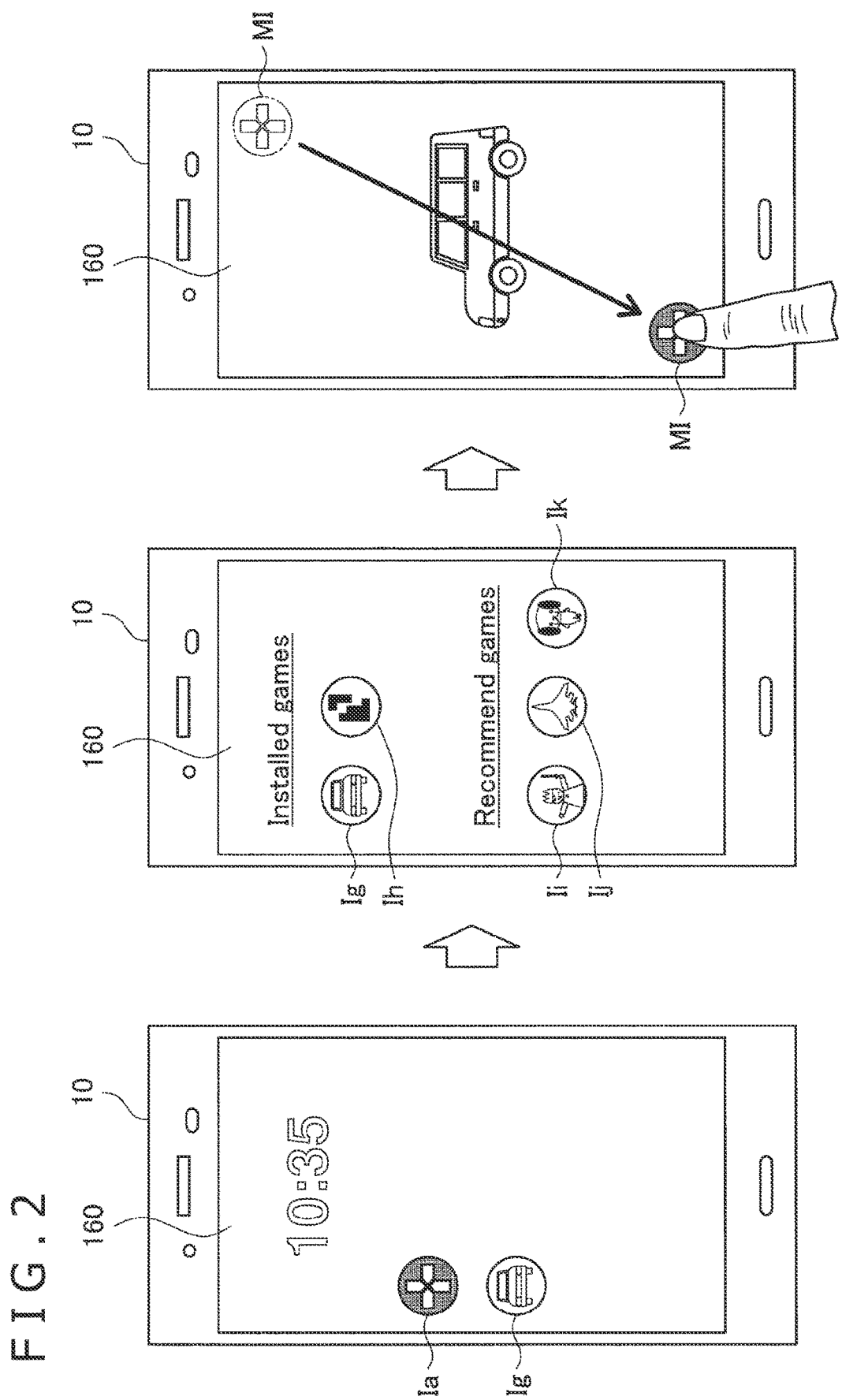

FIG.3A
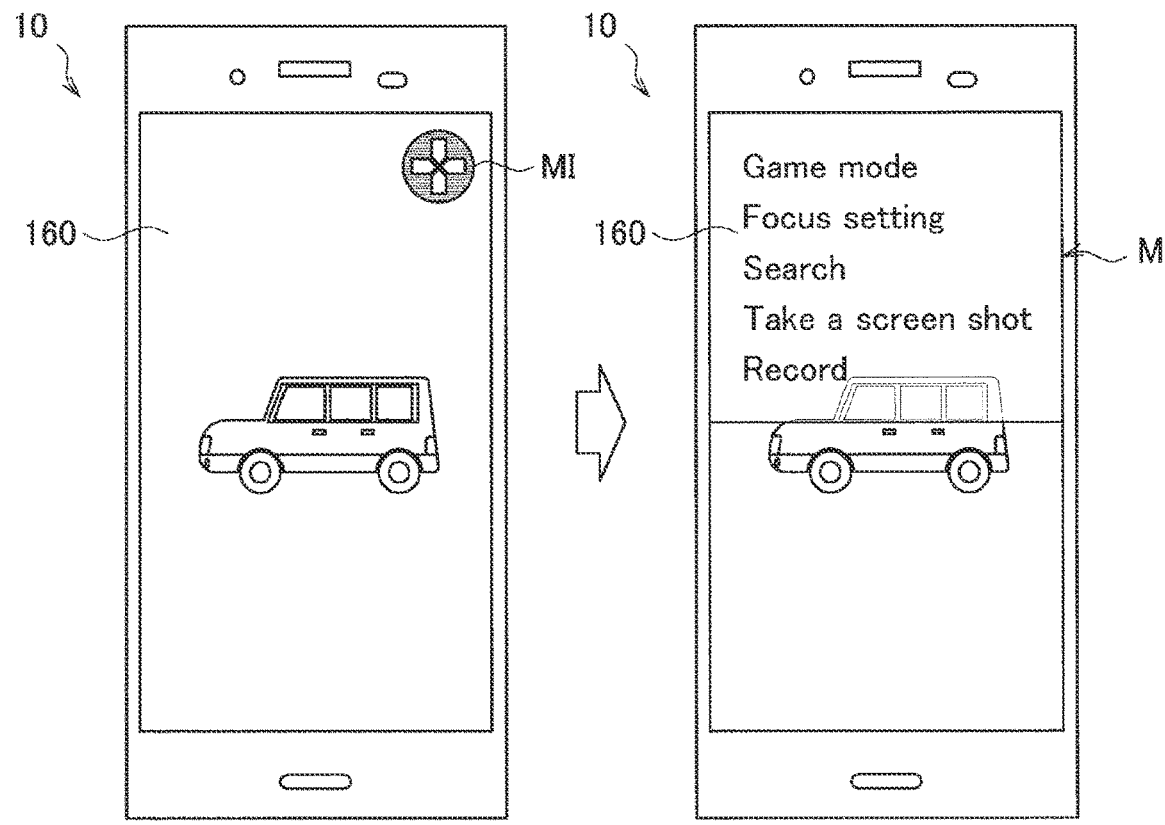
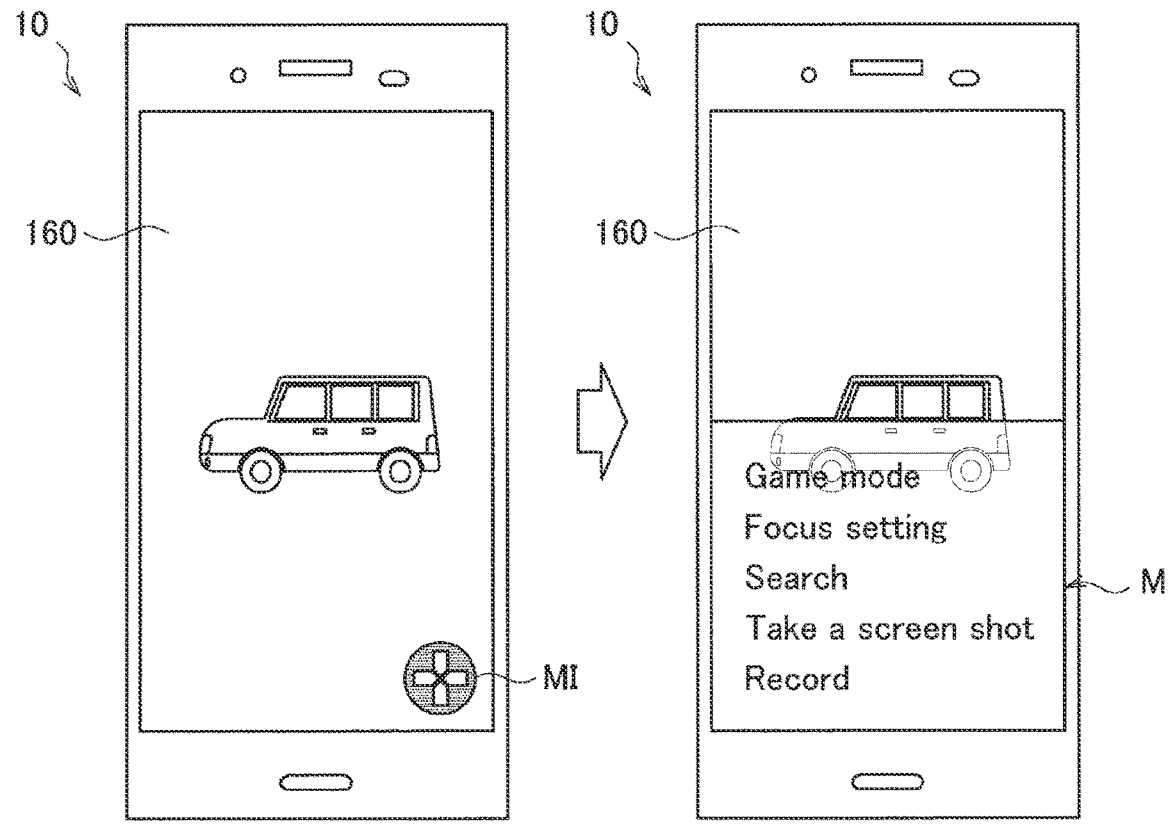

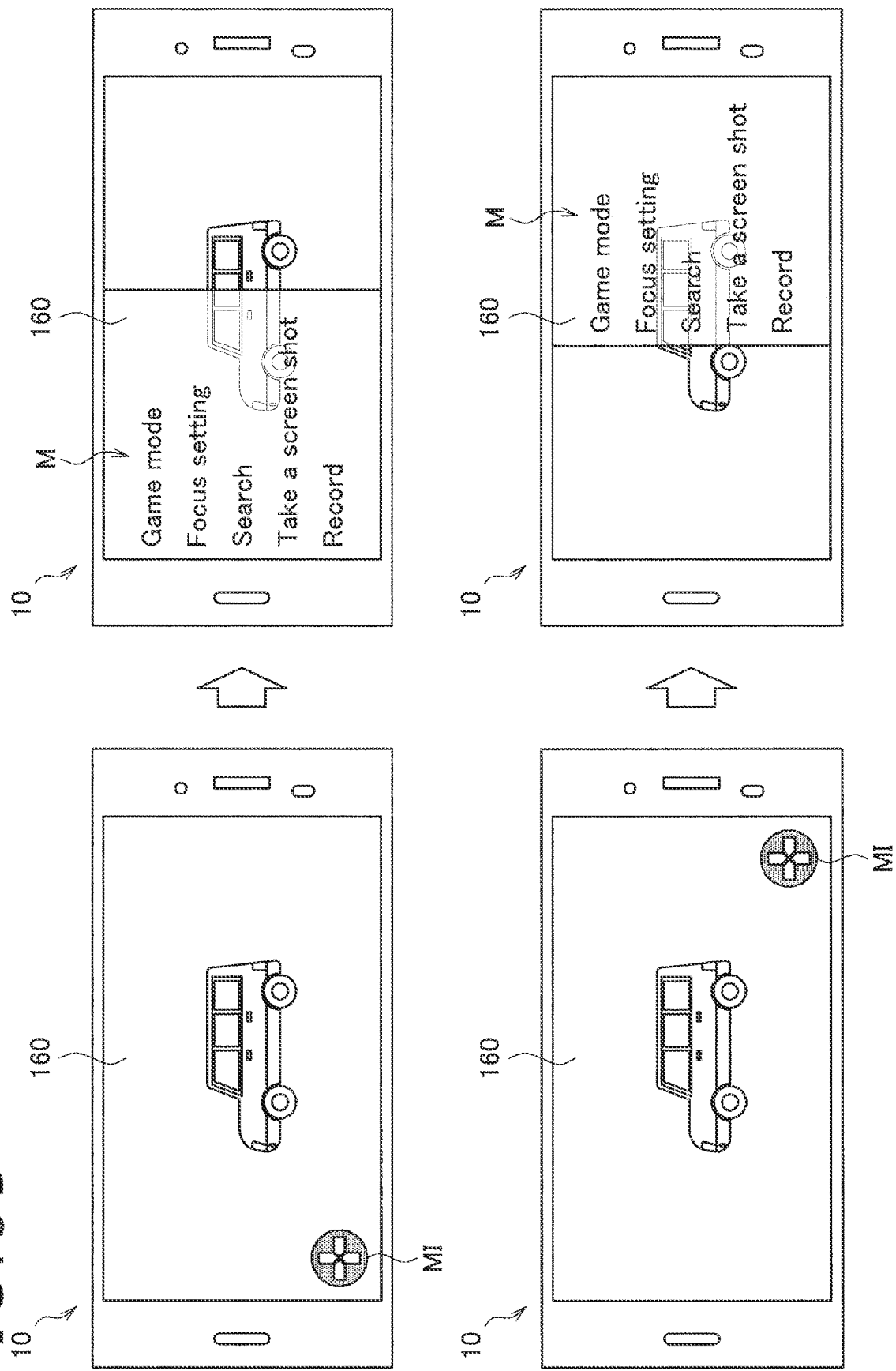

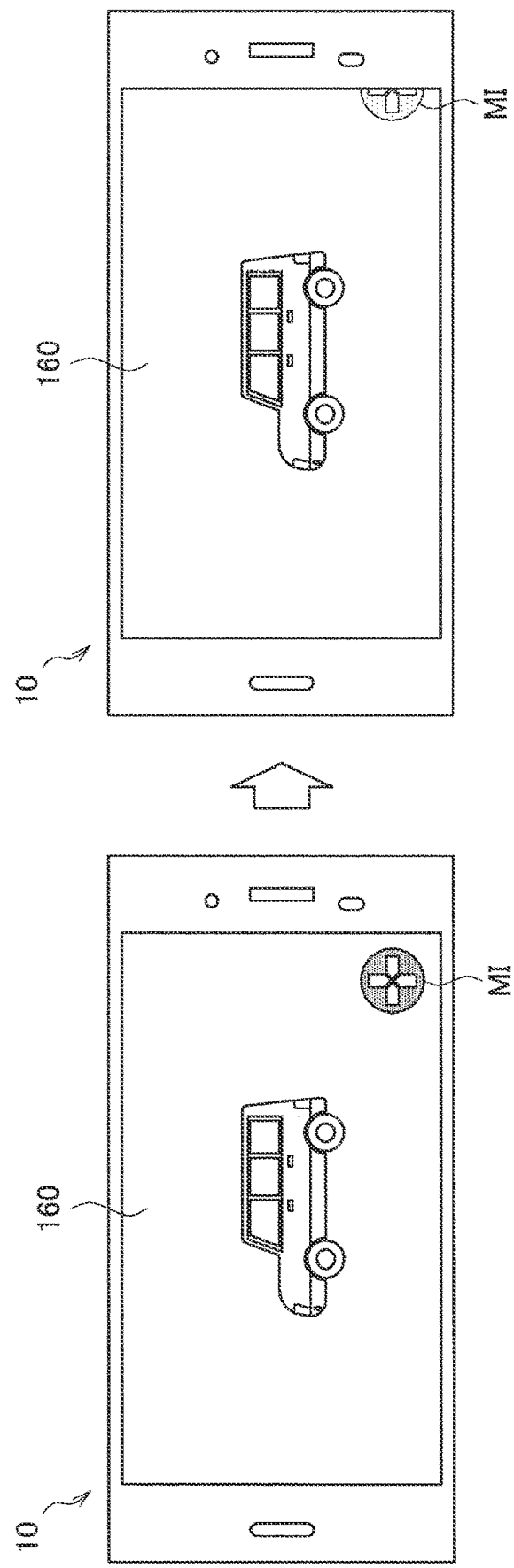

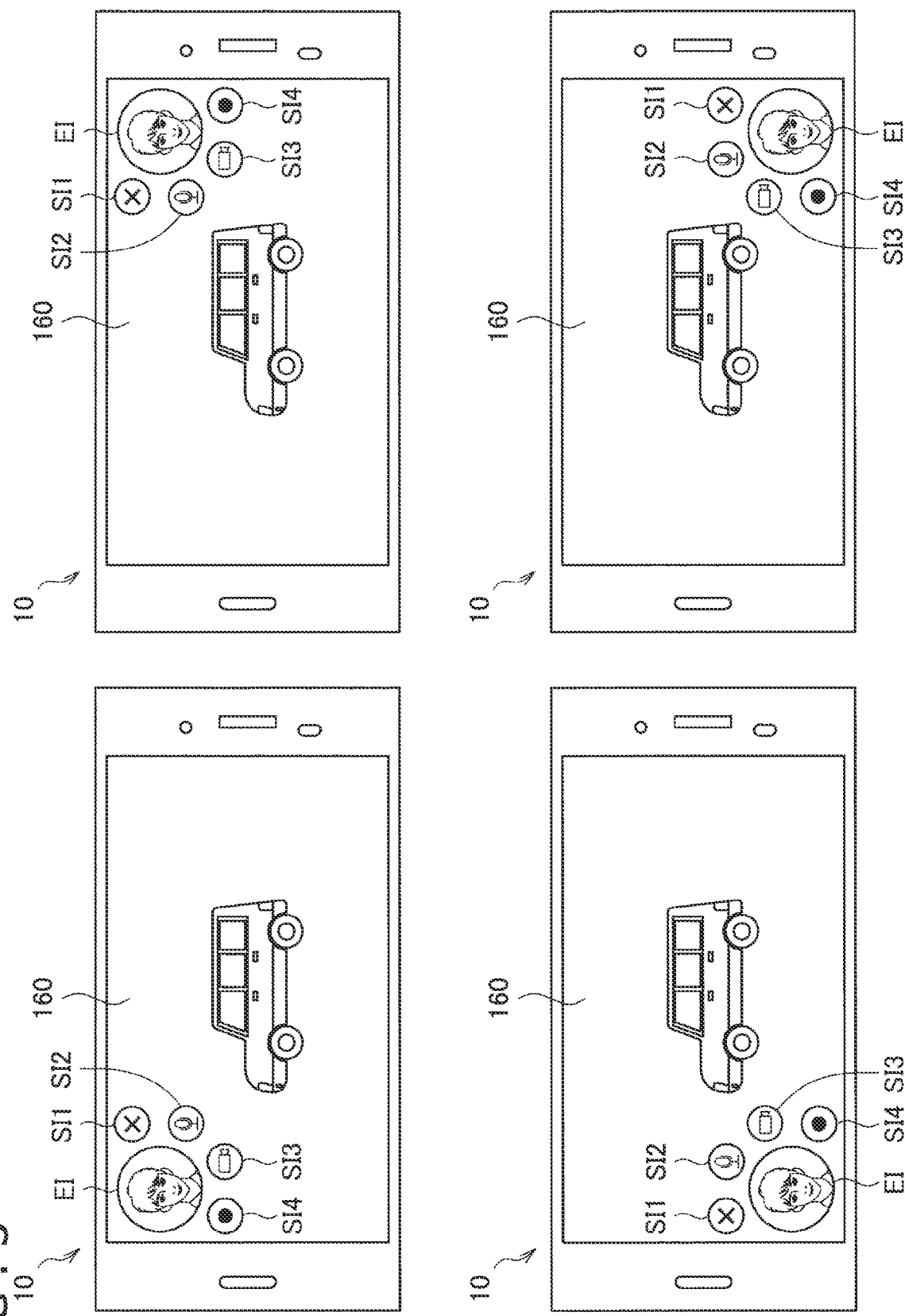

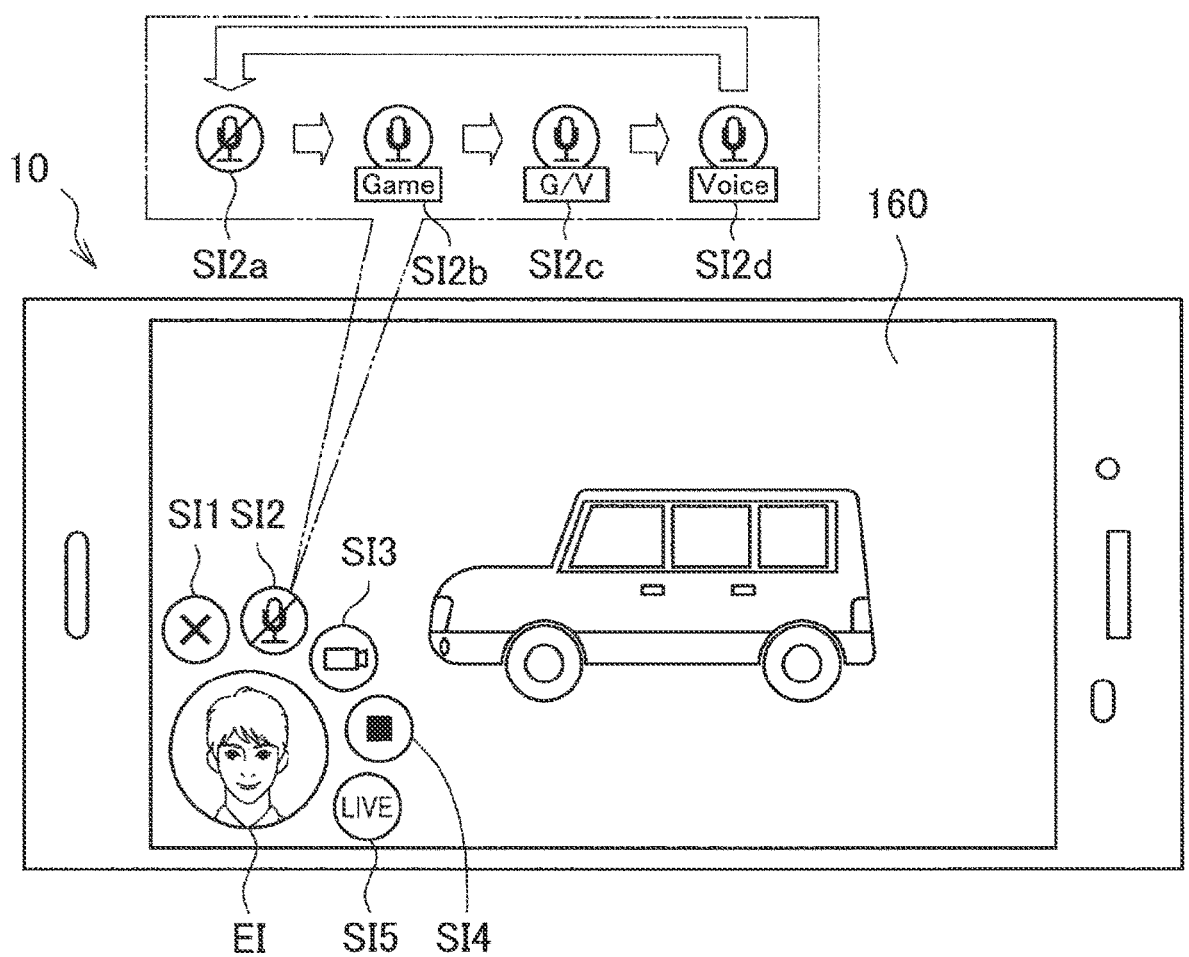

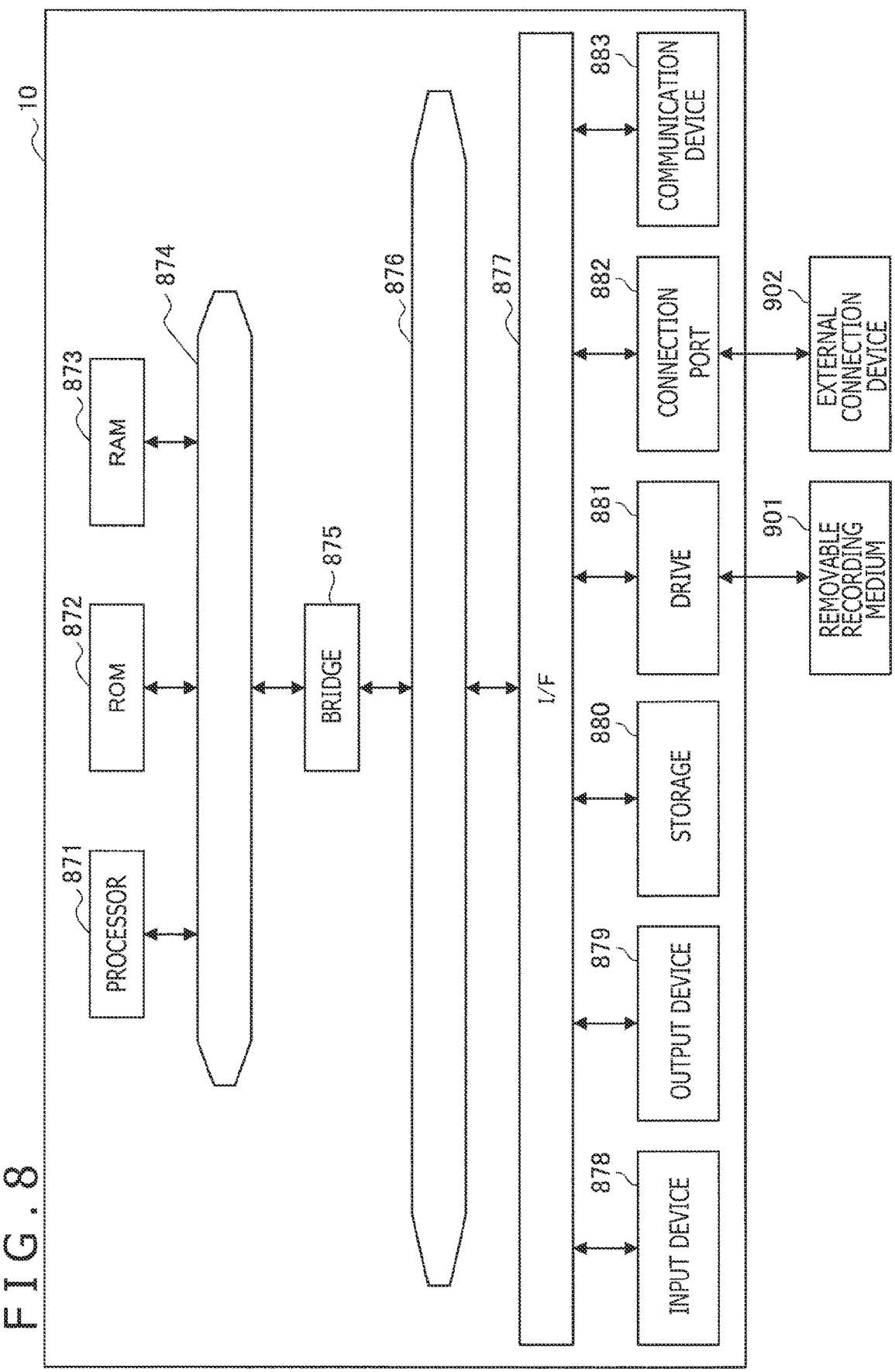

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/006909 filed on Feb. 22, 2019. Each of the above-referenced applications is hereby incorporated herein by reference in its entirety.

TECHNICAL FIELD

The present disclosure relates to an information processing apparatus, an information processing method, and a program.

BACKGROUND ART

In recent years, various kinds of applications with high entertainment value have been developed. Further, technologies which can create various kinds of added values by providing extension functions in cooperation with such applications as described above have also been proposed. For example, PTL 1 discloses a technology for synthesizing an image of a user who is playing a game application, onto a game screen, and for distributing the resulting screen.

CITATION LIST

Patent Literature

[PTL 1]
JP 2017-188833A

SUMMARY

Technical Problem

As described above, in the case where an extension function is provided to an external application, cooperation is important so as not to cause any interference with the original behavior of such an external application and the user's operation of the application.

Solution to Problem

According to the present disclosure, there is provided an information processing apparatus that includes a controller configured to control functional extension of an external application. The controller is configured to cause an extended menu icon whose display position is adjustable to be superimposed and displayed on a display window of the external application, and control a display position of an extended menu according to the display position of the extended menu icon; and cause an extension function icon to be superimposed and displayed on the display window with a display position of the extension function icon being adjustable, the extension function icon being associated with an extension function selected on the extended menu, and control a display position of a sub-icon accompanying the extension function icon, according to the display position of the extension function icon.

Further, according to the present disclosure, there is provided an information processing method that includes controlling, by a processor, functional extension of an external application. The controlling includes causing an extended menu icon whose display position is adjustable to be superimposed and displayed on a display window of the external application, and controlling a display position of an extended menu according to the display position of the extended menu icon; and causing an extension function icon to be superimposed and displayed on the display window with a display position of the extension function icon being adjustable, the extension function icon being associated with an extension function selected on the extended menu, and controlling a display position of a sub-icon accompanying the extension function icon, according to the display position of the extension function icon.

Further, according to the present disclosure, there is provided a program that causes a computer to function as an information processing apparatus that includes a controller configured to control functional extension of an external application. The controller is configured to cause an extended menu icon whose display position is adjustable to be superimposed and displayed on a display window of the external application, and control a display position of an extended menu according to the display position of the extended menu icon; and cause an extension function icon to be superimposed and displayed on the display window with a display position of the extension function icon being adjustable, the extension function icon being associated with an extension function selected on the extended menu, and control a display position of a sub-icon accompanying the extension function icon, according to the display position of the extension function icon.

BRIEF DESCRIPTION OF DRAWINGS

FIG. 2 depicts a diagram for illustrating cooperation between an extended application according to the embodiment and an external application.

FIG. 3A depicts a diagram for illustrating an extended menu display based on the display position of an extended menu icon according to the embodiment.

FIG. 3B depicts a diagram for illustrating an extended menu display based on the display position of an extended menu icon according to the embodiment.

FIG. 4 depicts a diagram for illustrating display control of an extended menu icon MI on the basis of non-operation time according to the embodiment.

FIG. 5 depicts a diagram for illustrating an image-recording function according to the embodiment.

FIG. 7 depicts a diagram for illustrating the image-recording function according to the embodiment.

FIG. 8 depicts a diagram for illustrating an example of a hardware configuration of the information processing apparatus according to one embodiment of the present disclosure.

DESCRIPTION OF EMBODIMENTS

Figure 1:
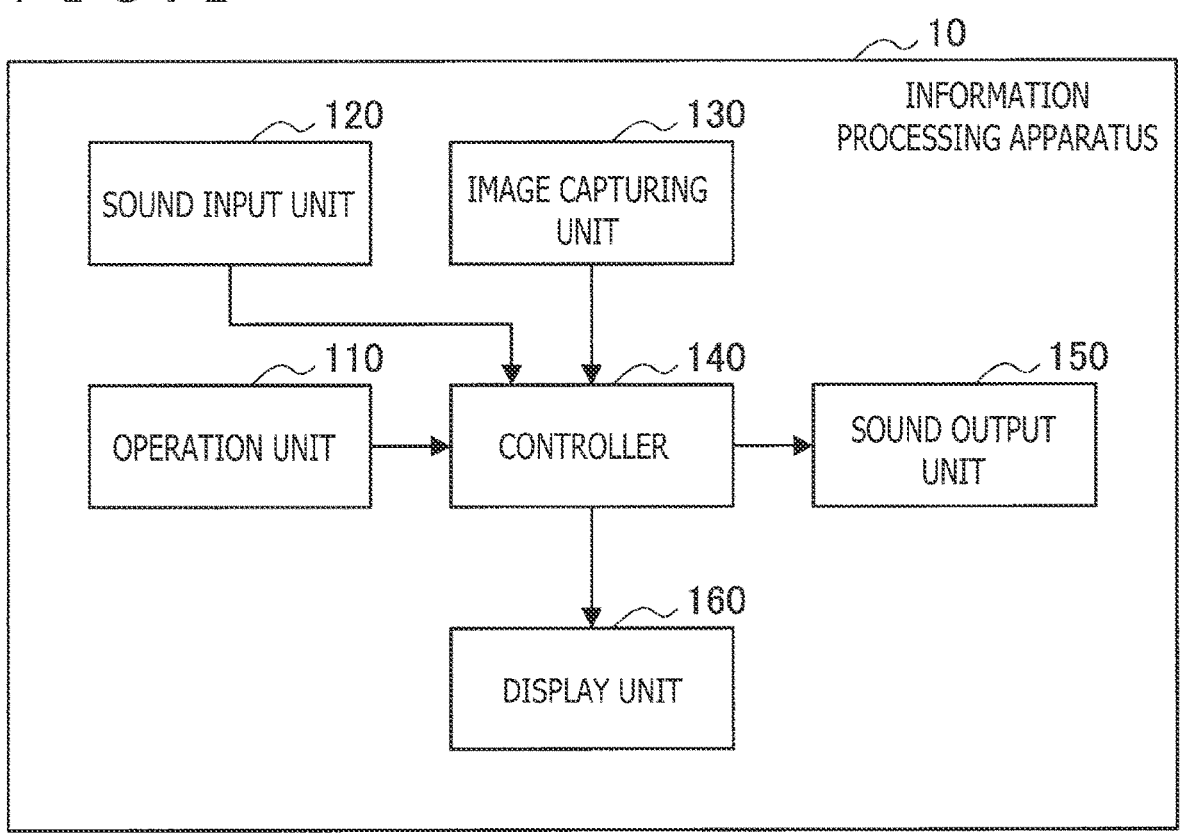
FIG. 1 depicts a block diagram illustrating an example of a functional configuration of an information processing apparatus according to one embodiment of the present disclosure.

Hereinafter, preferred embodiments of the present invention will be described in detail with reference to the appended drawings. Note that, in the present specification and the drawings, elements that have substantially the same function and structure are denoted with the same reference signs, and repeated explanation is omitted.

Note that descriptions will be made in the following order.
1. Embodiment
   1.1. Example of Functional Configuration
   1.2. Details of Function
2. Example of Hardware Configuration
3. Summary

1. Embodiment

<<1.1. Example of Functional Configuration>>

First, descriptions will be made regarding an example of the functional configuration of an information processing apparatus 10 according to one embodiment of the present disclosure. As described earlier, in recent years, various kinds of applications with high entertainment value have been developed. Examples of such applications as described above include game applications. A user can easily play various game applications by using, for example, a terminal such as a smartphone.

In addition, in recent years, user's enjoyment has not been limited to only playing a game application. Sharing the user's playing status of the game application with others has become popular. For example, the user can transmit, to an acquaintance, a moving image produced by synthesizing an image of a user's face on the recorded screen of playing status of a game application, or can distribute the moving image to an unspecified large number of viewers/listeners via a moving image distribution service or other services. Sharing of such a moving image allows the viewers/listeners to enjoy the playing status of the game application together with the distributer's reaction and the like, and thus enables the experience of gaming to be shared among a plurality of users.

Here, in the case where such a moving image as described above is to be produced, in general, editing work is necessary for synthesizing a user's own image, after the image of the playing status of the game application is recorded and the user's image is photographed simultaneously. However, such editing work requires knowledge regarding moving image editing and the like, in addition to time and labor.

On the other hand, in order to reduce such a burden on the distributor as described above, there is also known a technology for automatically producing a play moving image in which the distributor's own image is synthesized, by cooperating with the game application, as described in PTL 1, for example. By using such a technology, even a distributor having no knowledge regarding moving image editing can easily produce a play moving image of a game application, distribute the resulting image, and do any other related action.

However, in the case where such a technology as described above is used to provide an extension function to an external application, cooperation is important so as not to cause any interference with the original behavior of such an external application and the user's operation of the external application. In addition, it is also desirable that the user is able to operate the external application more intuitively and to flexibly control the extension function according to the situation of the external application.

The technical idea of the present disclosure has been conceived in view of the above-described situation and makes it possible to provide an extension function that permits more intuitive operations without interfering with the behavior of the external application. To this end, the information processing apparatus 10 according to the embodiment of the present disclosure includes a controller 140 that controls functional extension for an external application. Further, one of the features of the controller 140 according to the embodiment of the present disclosure is that an extended menu icon whose display position is adjustable is displayed and superimposed on the display window of the external application, and that the display position of an extended menu is controlled according to the display position of the displayed-superimposed extended menu icon. In addition, one of the features of the controller 140 according to the embodiment of the present disclosure is that the controller 140 causes an extension function icon associated with the extension function having been selected on the extended menu described above, to be displayed and superimposed on the display window described above, with the display position of the extension function icon being adjustable, and that the controller 140 controls the display position of a sub-icon accompanying the displayed-superimposed extension function icon according to the display position of the extension function icon.

Hereinafter, detailed descriptions will be made regarding an example of the functional configuration of the information processing apparatus 10, which has the features described above, according to the present embodiment. The information processing apparatus 10 according to the present embodiment may be a smartphone, a tablet, a PC (Personal Computer), or the like capable of executing various kinds of applications.

FIG. 1 depicts a block diagram illustrating an example of the functional configuration of the information processing apparatus 10 according to the present embodiment. As depicted in FIG. 1, the information processing apparatus 10 according to the present embodiment includes an operation unit 110, a sound input unit 120, an image capturing unit 130, the controller 140, a sound output unit 150, and a display unit 160.

(Operation Unit 110)

The operation unit 110 according to the present embodiment detects various operations by a user, such as an operation of an application. For this function, the operation unit 110 according to the present embodiment includes, for example, a touch panel, a button, a keyboard, a mouse, and the like. The operation unit 110 according to the present embodiment inputs, to the controller 140, information associated with the detected user's operation.

(Sound Input Unit 120)

The sound input unit 120 according to the present embodiment collects the sound uttered by the user and the like, on the basis of control by the controller 140. For this function, the sound input unit 120 according to the present embodiment includes a microphone and the like.

(Image Capturing Unit 130)

The image capturing unit 130 according to the present embodiment photographs a moving image on the basis of control by the controller 140. The image capturing unit 130 may photograph, for example, a face or the like of a user who operates the information processing apparatus 10. For this function, the image capturing unit 130 according to the present embodiment includes an imaging element. The smartphone, which is an example of the information processing apparatus 10, includes an inward-facing camera that photographs the user's face and the like and is disposed on the display unit 160 side and a main camera that photographs a landscape and the like and is disposed on the back side of the display unit 160. In the present embodiment, photographing by using the inward-facing camera is controlled, as an example.

(Controller 140) The controller 140 according to the present embodiment controls each of the components included in the information processing apparatus 10. In addition, one of the features of the controller 140 according to the present embodiment is to control the extension of the functions of external applications. Details of the functions of the controller 140 according to the present embodiment will separately be described later.

(Sound Output Unit 150)

The sound output unit 150 according to the present embodiment outputs various sounds. The sound output unit 150 according to the present embodiment outputs sounds according to the situation of an application on the basis of control by the controller 140, for example. For this function, the sound output unit 150 according to the present embodiment includes a loudspeaker and an amplifier.

(Display Unit 160)

The display unit 160 according to the present embodiment displays various kinds of visual information on the basis of control by the controller 140. The display unit 160 according to the present embodiment may display, for example, images and characters associated with an application. For this function, the display unit 160 according to the present embodiment includes various kinds of display devices.

Up to this point, the descriptions have been made regarding the example of the functional configuration of the information processing apparatus 10 according to the present embodiment. It should be noted that the configuration described above with reference to FIG. 1 is merely an example, and the functional configuration of the information processing apparatus 10 according to the present embodiment is not limited to such an example. The functional configuration of the information processing apparatus 10 according to the present embodiment may flexibly be modified according to specifications and operation.

<<1.2. Details of Function>>

Next, detailed descriptions will be made regarding the functions of the information processing apparatus 10 according to the present embodiment. One of the features of the controller 140 of the information processing apparatus 10 according to the present embodiment is to control extended applications for providing extension functions to various kinds of external applications. Examples of the external applications described above may include a game application. The controller 140 according to the present embodiment is capable of providing an extension function such as an image-recording function to an external game application produced by a different company, for example, by causing the above-described extended application to cooperate with the external application.

Note that descriptions will hereinafter be made by using a case, as a major example, where the external application associated with the present embodiment is a game application; however, the external application associated with the present embodiment is not limited to such an example. Examples of the external application associated with the present embodiment may include drawing applications, various kinds of editing applications, and applications for viewing/listening moving images, music, etc.

Further, the external application associated with the present embodiment is not limited to an application produced by a different company, and it may be an application produced in-house. By using the extended application according to the present embodiment, it is possible to easily provide an extension function to an already-existing application no matter who its producer is, without editing the source code or the like.

FIG. 2 depicts a diagram for illustrating cooperation between the extended application according to the present embodiment and an external application. Both the extended application according to the present embodiment and the external application function by being installed in the information processing apparatus 10.

On the left side of FIG. 2, there is depicted a home screen of an OS (Operating System) displayed on the display unit 160 of the information processing apparatus 10. Here, in the case where a user selects an icon Ia associated with an extended application, the controller 140 starts the extended application and, as depicted in the center of the figure, causes the display unit 160 to display a start screen of the extended application.

In the case of one example depicted in FIG. 2, on the start screen described above, there are displayed icons Ig and Ih associated with installed external applications that are available for cooperation and icons Ii to Ik associated with not-installed external applications that are recommended to the user. The controller 140 is capable of automatically producing a list of applications that includes installed external applications and exemplified applications based on recommendation information or other information. Further, such external applications displayed on the start screen may include another one optionally added by the user.

Here, in the case where the user selects an icon associated with an intended external application, as depicted on the right side of the figure, the controller 140 starts the external application corresponding to the selected icon, and causes the display unit 160 to display the display window of the intended external application. In FIG. 2, one example of the case is depicted in which the user selects the icon Ig associated with a racing game on the start screen described above.

Further, at this time, the controller 140 causes an extended menu icon MI to be superimposed and displayed on the display window described above. The extended menu icon MI may be an icon for invoking a menu of extension functions to be provided to the external application. In addition, the user may be allowed to move the extended menu icon MI to any position on the display window by dragging the extended menu icon MI, for example. By appropriately moving the extended menu icon MI according to the situation of display screen of the external application, it is possible to avoid interference with the user's operation of the external application and the display of various kinds of visual information displayed by the external application.

Note that the above description has been made regarding the exemplified case where the user starts the external application to be cooperated with the extended application via the start screen of the extended application. However, for example, the user may be able to directly select the icon associated with the intended external application, on the home screen, so as to start the intended external application in the state of being in cooperation with the extended application.

Next, the display control of the extended menu according to the present embodiment will be described. As described above, the user can invoke an extension function menu by selecting the extended menu icon MI that is superimposed and displayed on the display window of the external application. In such a case, the controller 140 according to the present embodiment controls the display position of the extended menu on the basis of the display position of the extended menu icon MI on the display window.

The controller 140 according to the present embodiment may control the display position of the extended menu on the basis of both the display position of the extended menu icon MI and the aspect ratio of the display window, for example.

FIGS. 3A and 3B are diagrams for illustrating the extended menu display based on the display position of the extended menu icon according to the present embodiment.

In general, there are an external application operated with the information processing apparatus 10 held vertically, an external application operated with the information processing apparatus 10 held horizontally, and an external application operated while the display of the information processing apparatus 10 is turned according to the posture of the information processing apparatus 10. For this reason, the controller 140 according to the present embodiment is capable of displaying the extended menu at a position which permits easier operation of the menu, by detecting the aspect ratio of the display window of the external application.

For example, in the case of one example depicted in FIG. 3A, the display unit 160 is displaying a display window that is suitable for the operation using the information processing apparatus 10 in the state of being held vertically. In this way, in the case where the display window is in a state where its side along the height direction is longer than its side along the width direction, the controller 140 may cause an extended menu M to be superimposed and displayed in either an upper region or a lower region of the display window that contains the display position of the extended menu icon MI.

For example, in the case of one example depicted in the upper stage of FIG. 3A, the extended menu icon MI is located in the upper region of the display window. Here, in the case where the extended menu icon MI is selected, the controller 140 may cause the extended menu M to be superimposed and displayed in the upper region of the display window, similarly to the display position of the extended menu icon MI.

On the other hand, in the case of one example depicted in the lower stage of FIG. 3A, the extended menu icon MI is located in the lower region of the display window. Here, in the case where the extended menu icon MI is selected, the controller 140 may cause the extended menu M to be superimposed and displayed in the lower region of the display window, similarly to the display position of the extended menu icon MI.

Further, for example, in the case of one example depicted in FIG. 3B, the display unit 160 is displaying a display window that is suitable for operation using the information processing apparatus 10 in the state of being held horizontally. In this way, in the case where the display window is in a state where its side along the width direction is longer than its side along the height direction, the controller 140 may cause the extended menu M to be superimposed and displayed in either a left-side region or a right-side region of the display window that contains the display position of the extended menu icon MI.

For example, in the case of one example depicted in the upper stage of FIG. 3B, the extended menu icon MI is located in the left-side region of the display window. Here, in the case where the extended menu icon MI is selected, the controller 140 may cause the extended menu M to be superimposed and displayed in the left-side region of the display window, similarly to the display position of the extended menu icon MI.

On the other hand, in the case of one example depicted in the lower stage of FIG. 3B, the extended menu icon MI is located in the right-side region of the display window. Here, in the case where the extended menu icon MI is selected, the controller 140 may cause the extended menu M to be superimposed and displayed in the right-side region of the display window, similarly to the display position of the extended menu icon MI.

Up to this point, the descriptions have been made regarding the display control of the extended menu M based on the display position of the extended menu icon MI according to the present embodiment. According to the display control as described above, the user having performed the operation of the extended menu icon MI can successively select any extension function in the same region, and thus, the extended menu display featuring easier operation can be realized. In addition, according to such a display control as described above, the extended menu M can be displayed in the same region as the display position of the extended menu icon MI that has been moved by the user to the position where the icon does not obstruct user's operations. This can effectively reduce the possibility that important visual information output by the external application is screened from view by the extended menu M.

Note that, in the example depicted in FIGS. 3A and 3B, a case is illustrated in which the functions of setting a game mode, setting focus, searching, taking a screenshot, and recording an image are offered as extension functions.

The function of setting a game mode described above may be an extension function capable of setting, for each external application, a mode such as a mode with priority given to the power saving or a mode with priority given to the performance, for example.

Further, the function of setting focus described above may be an extension function capable of setting various kinds of conditions that can help a user further concentrate on the external application, for example. The user may be able to set functions of releasing a RAM, locking a navigation bar, not displaying notification from other applications such as a message application, and turning-off the function of automatic brightness adjustment of the display unit 160, for example. The details of the game mode setting and focus setting may be stored after the external application has ended, thereby allowing the setting to be reflected automatically upon starting up the next operation.

Further, the function of searching described above may be an extension function capable of performing various kinds of information retrieval on the display window of the external application, without separately starting the browser application by the user. By use of the searching function, the user can play a game while referring to, on the display window, information for strategy, for example.

Further, the function of taking a screenshot described above may be an extension function capable of storing the playing status of the external application as a still image. In addition, the function of recording an image described above may be an extension function capable of storing the playing status of the external application as a moving image. Details of the function of image-recording according to the present embodiment will separately be described later.

Up to this point, the descriptions have been made regarding the example of the extended menu M and the extension function according to the present embodiment. Note that such an extension function as described above is used by the user according to the situation, so that the extension function is not assumed to be usually frequently operated. For this reason, the extended menu icon MI for invoking the extended menu M as described above is preferably displayed so as not to interfere with the playing of the external application as much as possible in the case where the user's operation is not given.

For this reason, the controller 140 according to the present embodiment may control the display position and the manner of display of the extended menu icon MI such that the extended menu icon MI becomes less noticeable in the case where the user's operation of the extended menu icon MI is not performed for a predetermined period of time.

FIG. 4 depicts a diagram for illustrating the display control of the extended menu icon MI on the basis of non-operation time according to the present embodiment. In one example depicted on the left side of FIG. 4, the extended menu icon MI is disposed in the lower right corner of the display window. In this way, in the case where the extended menu icon MI in an edge region in the display window has not been used for more than a predetermined period of time, the controller 140 may cause the extended menu icon MI to move to a position where at least a part of the extended menu icon MI hides outside the display window as described on the right side of FIG. 4.

Further, in addition to the control of the display position described above, the controller 140 according to the present embodiment may control the manner of display such that the extended menu icon MI becomes less noticeable. For example, in the case where the extended menu icon MI has not been used for more than a predetermined period of time, the controller 140 may control the superimposed display such that the degree of highlighting of the extended menu icon MI decreases. The controller 140 may cause the extended menu icon MI to be grayed out or to be made translucent, for example.

According to the control as described above, in the case where no operation of the extension function is made for a long period of time, the extended menu icon MI is automatically moved to a position where the extended menu icon MI is less likely to interfere with the playing of the external application, and is reduced in the degree of highlighting, thereby allowing the user to concentrate on playing the external application.

Note that, in the case where the extended menu icon MI is disposed in a center region of the display window, it is assumed that the user is highly likely to perform an operation of the extension function from now on. For this reason, in the case where the extended menu icon MI is disposed in the center region, the controller 140 need not perform both the change of the display position and the control of the manner of display as described above.

Next, a detailed description will be made regarding the image-recording function that is one of the extension functions according to the present embodiment. The user, through use of the extended application according to the present embodiment, can record the image of the playing status of any external application and store it as a moving image. In such a case, the controller 140 according to the present embodiment may cause the image photographed by the image capturing unit 130, to be superimposed and displayed on the display window, and may record the superimposed image together with the playing status of the external application.

Figure 6:
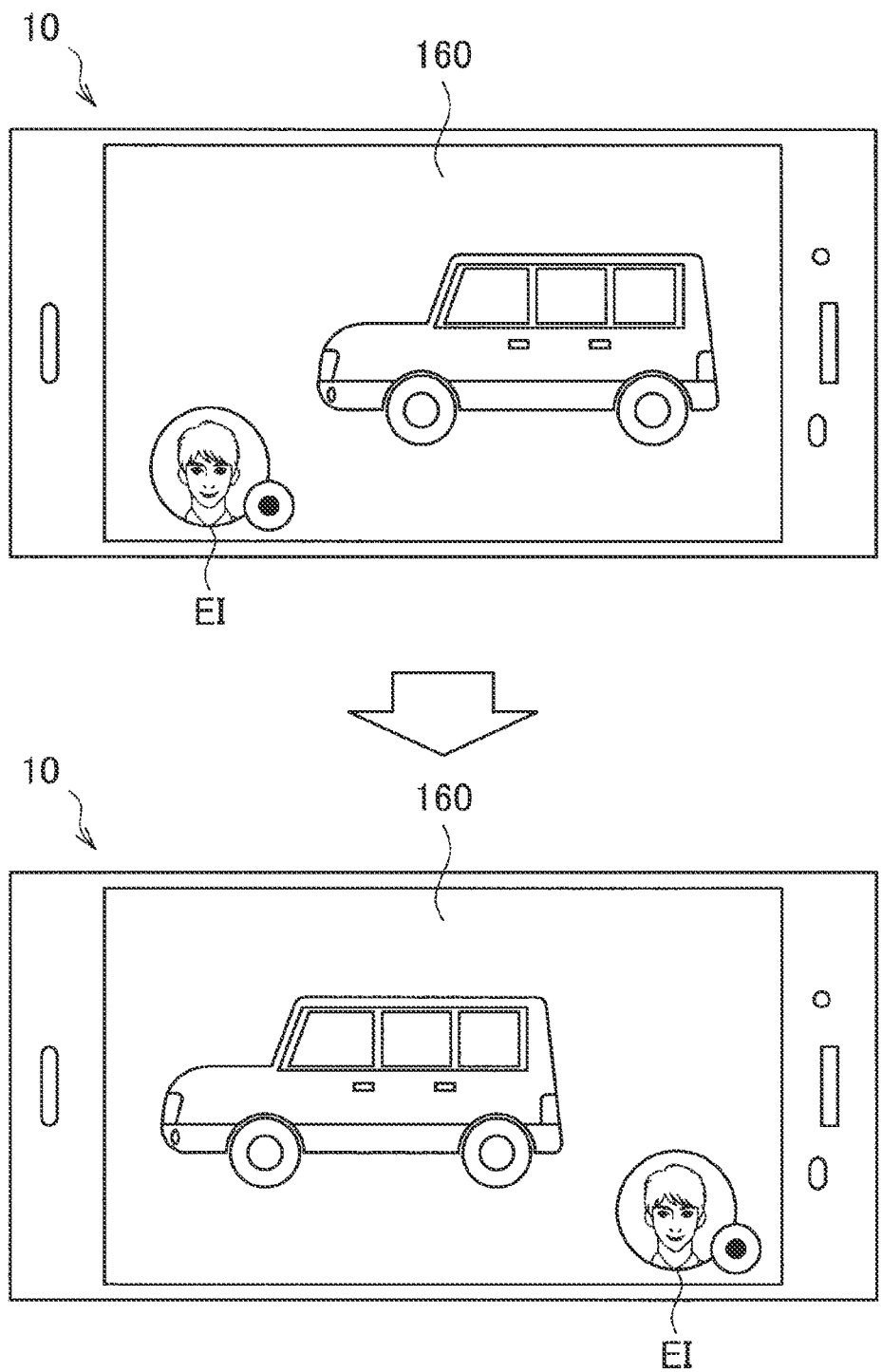
FIG. 6 depicts a diagram for illustrating the image-recording function according to the embodiment.

FIGS. 5 to 7 depict diagrams for illustrating the image-recording function according to the present embodiment. In the case where the image-recording function is selected on the extended menu M, the controller 140 causes both an extension function icon EI associated with the image-recording function and a plurality of accompanying sub-icons SI to be superimposed and displayed on the display window of the external application, as depicted in FIG. 5.

In such a case, as depicted in the figure, the controller 140 according to the present embodiment may cause a preview of the image photographed by the image capturing unit 130, to be superimposed and displayed as the extension function icon EI. According to the control, the user can check the user's own image before starting the image-recording, so that the user can make preparations for tidying him/herself and the like.

Note that a sub-icon SI1 may be an icon for the user to issue an instruction to end the image-recording function. In the case where the sub-icon SI1 is selected, the controller 140 may perform control such that the extension function icon EI and all sub-icons SI are not displayed while the extended menu icon MI is superimposed and displayed again.

Further, a sub-icon SI2 may be an icon for the user to issue an instruction to control the manner of sound-recording in association with the image-recording of the external application. The controller 140 according to the present embodiment is capable of dynamically controlling the manner of the sound-recording described above on the basis of the user's operation of the sub-icon SI2. For example, the controller 140 may dynamically switch between on and off of the sound-recording described above, on the basis of the operation of the sub-icon SI2.

Further, a sub-icon SI3 may be an icon for the user to issue an instruction to start and end the photographing by the image capturing unit 130. The controller 140 according to the present embodiment is capable of dynamically controlling both the photographing by the image capturing unit 130 and the superimposing and displaying of the photographed image, on the basis of the user's operation of the sub-icon SI3. The sub-icon SI3 for starting and ending the photographing is disposed apart from the icon for starting and ending the image-recording function. Therefore, the user can check the user's own image before starting the photographing, so that the user can make preparations for tidying him/herself and the like.

Further, a sub-icon SI4 may be an icon for the user to issue an instruction to start and end the image-recording function. The controller 140 according to the present embodiment may control the start and end of the image-recording function, on the basis of the user's operation of the sub-icon SI4.

Up to this point, the description has been made regarding the example of the sub-icons SI according to the present embodiment. In this way, with the extended applications according to the present embodiment, the user can flexibly and dynamically set the superimposition of a photographed image, the manner of sound-recording, and any other related operation, and then perform the recording of image of the playing status.

Note that, similarly to the extended menu icon MI, the extension function icon EI according to the present embodiment may optionally be adjusted regarding its display position. In such a case, the controller 140 according to the present embodiment controls the display positions of the sub-icons SI on the basis of the display position of the extension function icon EI.

More specifically, on the basis of the display position of the extension function icon EI, the controller 140 according to the present embodiment may cause the sub-icons SI to be displayed at the circumference of the extension function icon such that the sub-icons SI can fit inside the display window.

For example, in the case of one example depicted on the upper left side of FIG. 5, the extension function icon EI is disposed in the upper left corner on the display window. In such a case, the controller 140 may cause the sub-icons SI1 to SI4 to be displayed on the right and lower sides of the extension function icon EI.

Further, for example, in the case of one example depicted on the upper right side of FIG. 5, the extension function icon EI is disposed in the upper right corner on the display window. In such a case, the controller 140 may cause the sub-icons SI1 to SI4 to be displayed on the left and lower sides of the extension function icon EI.

Further, for example, in the case of one example depicted on the lower left side of FIG. 5, the extension function icon EI is disposed in the lower left corner on the display window. In such a case, the controller 140 may cause the sub-icons SI1 to SI4 to be displayed on the upper and right sides of the extension function icon EI.

Further, for example, in the case of one example depicted on the lower right side of FIG. 5, the extension function icon EI is disposed in the lower right corner on the display window. In such a case, the controller 140 may cause the sub-icons SI1 to SI4 to be displayed on the upper and left sides of the extension function icon EI. Note that FIG. 5 depicts the examples of display of the sub-icons SI1 to SI4 in the case where the extension function icon EI is disposed in any one of the four corners on the display window. On the other hand, the display of such sub-icons SI1 to SI4 as described above is not limited to the case where the extension function icon EI is disposed in one of the four corners on the display window. That is, in the case where the display window is split into four parts, i.e., in two vertical columns by two horizontal rows, the display of the sub-icons is controlled according to the region in which the extension function icon EI is disposed. For example, in the case depicted in FIG. 5, when the extension function icon EI is in a state of being disposed in the upper left region of the display window, the sub-icons SI1 to SI4 are displayed on the right and lower sides of the extension function icon EI. In the case where the user drags the extension function icon EI and the extension function icon EI is then moved to the upper right region of the display window, the sub-icons SI1 to SI4 are displayed on the left and lower sides of the extension function icon EI.

According to the control as described above, it is possible to avoid encountering the situation in which, in the case where the sub-icons SI are moved accompanying the extension function icon EI, the sub-icons partly hide outside the display window, and thus, part of the functions become unavailable. Note that, during moving the extension function icon EI to any position on the display window by dragging the extension function icon EI, the display state may be made such that the sub-icons SI1 to SI4 are not displayed while only the extension function icon EI is displayed. With such a configuration, the amount of information displayed on the screen is reduced, so that the user can easily concentrate on moving the icon. In such a case, after the dragging operation for the moving is finished and the user releases the user's finger from, for example, the display unit 160 provided to serve as a touch panel, the controller 140 can cause the sub-icons SI1 to SI4 to be displayed again.

Next, control performed after the image-recording is started will be described. As described above, the controller 140 according to the present embodiment is capable of starting the image-recording function on the basis of the user's operation of the sub-icon SI4. In such a case, as depicted in FIG. 6, the controller 140 may cause the sub-icons SI1 to SI4 not to be displayed and may provide the extension function icon EI with a visual effect indicating that the image-recording is being performed. According to the control, it is possible to prevent unnecessary information such as the sub-icons SI from being recorded together. Further, in a state in which the photographing had been started by the operation of the sub-icon SI3, the display state becomes such that an image of a user's face or the like photographed by the image capturing unit 130 is superimposed and displayed as the extension function icon EI, as depicted in FIG. 6, and an image of facial expressions of the user playing the external application can thus be recorded.

In addition, even after the image-recording has been started, the extension function icon EI may be movable to any position. For example, the user can perform a dragging operation or the like according to the situation of the external application, thereby moving the extension function icon EI to a position where the icon does not obstruct user's operations.

Note that such moving of the extension function icon EI as described above may automatically be performed by the controller 140. The controller 140, through analysis of images associated with the external application, may automatically move the extension function icon EI into a region in the screen in which less movement appears or no UI such as a button for the user to operate is disposed. In addition, the controller 140, through learning of user's operations for moving, may move the extension function icon EI to an optimum display position according to the status of the game, for example. The controller 140 may perform such an automatic positional control as described above for the extended menu icon MI as well.

Further, setting that relates to the sound-recording and the superimposed display of a photographed image may be changeable any time even after the image-recording has been started.

In the case where the extension function icon EI is pressed and selected by the user after the image-recording has started, the controller 140 causes the sub-icons SI to be superimposed and displayed again on the display window as depicted in FIG. 7, thereby offering a state in which the user can perform various kinds of settings. At this time, the controller 140 may change the display from the display associated with the sub-icon SI4 to a visual effect for issuing an instruction to end the image-recording. The user can press the sub-icon SI4 to issue the instruction to end the image-recording. Note that the user may press the extension function icon EI again such that the sub-icons SI are caused again not to be displayed. Further, even in the state in which the sub-icons SI are displayed together with the extension function icon E1, during moving the extension function icon EI to any position on the display window by dragging the extension function icon EI, the display state may be made such that the sub-icons SI are not displayed while only the extension function icon EI is displayed.

Further, for example, the user may press the sub-icon SI3 to change the operations, i.e., photographing of an image by the image capturing unit 130 and the presence and absence of the superimposed display of the photographed image. With the extended application according to the present embodiment, even after the image-recording has started, it is possible to dynamically change the presence and absence of the superimposed display of the photographed image according to the situation.

Further, in a similar way to this, the user may press the sub-icon SI2 to change the manner of the sound-recording, for example. In FIG. 7, one example of the case is depicted in which the display of the sub-icon SI2 changes according to a mode, each time the sub-icon SI2 is pressed.

For example, a sub-icon SI2a indicates a mode of not performing the sound-recording. Further, a sub-icon SI2b indicates a mode of performing the sound-recording of only the sound output by the external application. Further, a sub-icon SI2c indicates a mode of performing the sound-recording of both the sound output by the external application and the sound uttered by the user. Further, a sub-icon SI2d indicates a mode of performing the sound-recording of only the sound uttered by the user. In this way, the manner of the sound-recording according to the present embodiment may include on and off of sound-recording and modes of sound-recording.

The controller 140 according to the present embodiment controls the change of mode as described above which is selected by the user's operation of the sub-icon SI2, and controls the sound-recording according to each mode. With such control, it is possible to dynamically select the on and off of sound-recording and the sounds to be recorded according to the situation, so that more flexible production of moving images can be realized.

Note that, in FIG. 7, the description of the example of the case has been made by using the example in which the state of the sub-icon SI2 changes each time the sub-icon SI2 is pressed; however, the controller 140 may cause a plurality of additional icons for designating the mode of sound-recording, to be superimposed and displayed at the circumference of the sub-icon SI2, for example.

Up to this point, the description has been made regarding the dynamic changes of setting according to the present embodiment after the image-recording has started. With the above-described functions of the extended application according to the present embodiment, it is possible to dynamically and flexibly change the content to be recorded, according to the playing status or the like of an external application, so that it is possible to realize production of moving images in which user's intention is reflected more.

Note that the above-described setting of the image-recording function is merely an example. The image-recording function according to the present embodiment is capable of performing various kinds of settings other than the superimposed display of a photographed image and the sound-recording. For example, the controller 140 according to the present embodiment may control the release of a recorded image to an external service.

In an example depicted in FIG. 7, a sub-icon SI5 may be an icon for the user to issue an instruction to release a recorded moving image to an external service. The controller 140 according to the present embodiment is also capable of dynamically controlling the release of recorded moving images to various external services on the basis of the user's operation of the sub-icon SI5.

In such a case, the user may be able to pre-set an external service as a destination for the release or able to optionally select an external service as a destination for the release through the user's operation of the sub-icon SI5. With this, it is possible to distribute, on a real time basis, a moving image recorded together with a recorded image of a playing status via one or more external services.

Further, in the above description, the example of the case has been explained in which an image photographed by the image capturing unit 130 is superimposed and displayed on the display window and is recorded together with the playing status; however, the image to be superimposed and displayed is not limited to the image photographed by the image capturing unit 130.

The controller 140 may acquire, for example, a moving image associated with the playing status of another user who is playing the game together with the user via a network, an image produced by photographing such another user, and any other related image, and may then cause the acquired image to be superimposed and displayed. Further, the controller 140 may cause an avatar or the like to be superimposed and displayed by animation in place of the photographed image of the user.

In this way, the image to be superimposed and displayed on the display window may optionally be set by the user. In such a case, the sub-icon SI2 associated with the superimposed display may be an icon for the user to issue an instruction to change the presence and absence of the superimposed display of various acquired images and to determine the kind of image to be superimposed and displayed.

2. Example of Hardware Configuration

Next, descriptions will be made regarding an example of a hardware configuration of the information processing apparatus 10 according to one embodiment of the present disclosure. FIG. 8 depicts a diagram for illustrating an example of the hardware configuration of the information processing apparatus 10 according to the embodiment of the present disclosure. As depicted in FIG. 8, the information processing apparatus 10 includes a processor 871, a ROM 872, a RAM 873, a host bus 874, a bridge 875, an external bus 876, an interface 877, an input device 878, an output device 879, a storage 880, a drive 881, a connection port 882, and a communication device 883, for example. Note that the hardware configuration described herein is only an example; therefore, some of the constituent elements may be omitted. Further, constituent elements other than the constituent elements described herein may be further included.

(Processor 871)

The processor 871 functions as an arithmetic processing device or a control device, for example, and controls all or part of operations of each of the constituent elements on the basis of various programs that are stored in the ROM 872, the RAM 873, the storage 880, or a removable recording medium 901.

(ROM 872 and RAM 873)

The ROM 872 is means that stores programs to be loaded into the processor 871, data to be used for computing, or the like. In the RAM 873, for example, programs to be loaded into the processor 871, various parameters that appropriately change in executing the programs, etc., are stored temporality or permanently.

(Host Bus 874, Bridge 875, External Bus 876, and Interface 877)

The processor 871, the ROM 872, and the RAM 873 are mutually connected, for example, via the host bus 874 capable of high-speed data transmission. On the other hand, the host bus 874 is connected, via the bridge 875, to the external bus 876 capable of relatively low-speed data transmission, for example. Further, the external bus 876 is connected to various constituent elements via the interface 877.

(Input Device 878)

The input device 878 employs a mouse, a keyboard, a touch panel, a button, a switch, and a lever, for example. In addition, in some cases, the input device 878 employs a remote controller (hereinafter, referred to as a remote) capable of transmitting a control signal by using infrared rays or any other radio wave. Further, the input device 878 includes a sound input device such as a microphone.

(Output Device 879)

The output device 879 is a device which is capable of visually or audibly notifying a user of acquired information. Examples of such a device include a display device such as a CRT (Cathode Ray Tube), an LCD, or an organic EL, an audio output device such as a loudspeaker or headphone, a printer, a mobile phone, a facsimile, and any other terminal. Further, the output device 879 according to the present disclosure includes various kinds of vibration devices capable of outputting tactile stimulation.

(Storage 880)

The storage 880 is a device that stores various kinds of data. The storage 880 includes, for example, a magnetic storage device such as a hard disk drive (HDD), a semiconductor storage device, an optical storage device, a magneto-optical storage device, or any other storage device.

(Drive 881)

The drive 881 is a device that reads out information stored in the removable recording medium 901 such as a magnetic disk, an optical disk, a magneto-optical disk, a semiconductor memory, or any other record medium, and that writes information in the removable recording medium 901, for example.

(Removable Recording Medium 901)

The removable recording medium 901 includes, for example, a DVD medium, a Blu-ray (registered trademark) medium, an HD DVD medium, various kinds of semiconductor storage media, and any other record medium. Needless to say, the removable recording medium 901 may also be, for example, an IC card equipped with a non-contact IC chip, an electronic device, or the like.

(Connection Port 882)

The connection port 882 is a port for connection of an external connection device 902. Examples of the port include a USB (Universal Serial Bus) port, an IEEE1394 port, an SCSI (Small Computer System Interface), an RS-232C port, an optical audio terminal, and any other connection port.

(External Connection Device 902)

The external connection device 902 includes, for example, a printer, a portable music player, a digital camera, a digital video camera, an IC recorder, and the like.

(Communication Device 883)

The communication device 883 is a communication device for connection to a network. Examples of the communication device include a communication card for a wired or wireless LAN, Bluetooth (registered trademark), or WUSB (Wireless USB), a router for optical communication, a router for ADSL (Asymmetric Digital Subscriber Line), a modem for various kinds of communication, and any other communication device.

3. Summary

As described above, the information processing apparatus 10 according to the embodiment of the present disclosure includes the controller 140 that controls the functional extension of an external application. Further, one of the features of the controller 140 according to the embodiment of the present disclosure is to cause an extended menu icon whose display position is adjustable, to be superimposed and displayed on the display window of the external application, and is to control the display position of an extended menu according to the display position of the superimposed-displayed extended menu icon. In addition, one of the features of the controller 140 according to the embodiment of the present disclosure is to cause an extension function icon associated with the extension function selected on the above-described extended menu to be superimposed and displayed on the above-described display window, with the display position of the extension function icon being adjustable, and is to control the display position of a sub-icon accompanying the superimposed-displayed extension function icon, according to the display position of the extension function icon. According to the configuration, it is possible to provide the extension function that permits more intuitive operations without interfering with the behavior of the external application.

While the preferred embodiments of the present disclosure have been described above in detail with reference to the accompanying drawings, the present disclosure is not limited to the above examples. It is obvious that a person skilled in the art may find various alterations and modifications within the scope of the appended claims, and it should be understood that such alterations and modifications will naturally fall within the technical scope of the present disclosure.

Further, the effects described in the present specification are merely illustrative or exemplified effects, and are not limitative. That is, with or in the place of the above effects, the technology according to the present disclosure may achieve other effects that are clear to those skilled in the art from the description of the present specification.

Further, a program that causes hardware such as a CPU, a ROM, and a RAM built in a computer to exert the functions equivalent to the configurations that the information processing apparatus 10 has can also be created, and a computer-readable non-transitory recording medium that records such a program can also be provided.

Note that the following configurations also belong to the technical scope of the present disclosure.

(1)

An information processing apparatus including:
a controller configured to control functional extension of an external application, in which
the controller is configured to
cause an extended menu icon whose display position is adjustable to be superimposed and displayed on a display window of the external application, and control a display position of an extended menu according to the display position of the extended menu icon, and
cause an extension function icon to be superimposed and displayed on the display window with a display position of the extension function icon being adjustable, the extension function icon being associated with an extension function selected on the extended menu, and control a display position of a sub-icon accompanying the extension function icon, according to the display position of the extension function icon.

(2)

The information processing apparatus according to (1), in which the controller controls the display position of the extended menu on the basis of the display position of the extended menu icon and an aspect ratio of the display window.

(3)

The information processing apparatus according to (2), in which,
in the case where a side along a height direction of the display window is longer than a side along a width direction of the display window, the controller causes the extended menu to be superimposed and displayed in either an upper region or a lower region of the display window including the display position of the extended menu icon, and in the case where the side along the width direction of the display window is longer than the side along the height direction of the display window, the controller causes the extended menu to be superimposed and displayed in either a left-side region or a right-side region of the display window including the display position of the extended menu icon.

(4)

The information processing apparatus according to any one of (1) to (3), in which the controller causes the sub-icon to be displayed at a circumference of the extension function icon such that the sub-icon fits inside the display window, according to the display position of the extension function icon.

(5)

The information processing apparatus according to (4), in which the extension function icon includes an icon associated with an image-recording function for recording an image of a playing status of the external application.

(6)

The information processing apparatus according to (5), in which the sub-icon includes an icon for a user to issue an instruction to start and end the image-recording function, and the controller controls the start and the end of the image-recording function on the basis of a user's operation of the icon included in the sub-icon.

(7)

The information processing apparatus according to (5) or (6), in which the controller controls superimposed-displaying of an acquired image on the display window and records, together with the playing status of the external application, the acquired image that is superimposed and displayed.

(8)

The information processing apparatus according to (7), in which the sub-icon includes an icon for a user to issue an instruction to select presence or absence of the superimposed-displaying of the acquired image, and the controller dynamically changes between the presence and the absence of the superimposed-displaying of the acquired image on the basis of a user's operation of the icon included in the sub-icon.

(9)

The information processing apparatus according to (7) or (8), in which the acquired image includes an image photographed by a terminal displaying the display window.

(10)

The information processing apparatus according to (9), in which the controller causes a preview of the photographed image to be superimposed and displayed as the extension function icon.

(11)

The information processing apparatus according to (9) or (10), in which the sub-icon includes an icon for a user to issue an instruction to start and end photographing by the terminal, and the controller dynamically controls the photographing by the terminal and superimposed-displaying of the photographed image, on the basis of a user's operation of the icon included in the sub-icon.

(12)

The information processing apparatus according to any one of (5) to (11), in which the sub-icon includes an icon for a user to issue an instruction to select a manner of sound-recording in association with image-recording of the external application, and the controller dynamically controls the manner of the sound-recording on the basis of a user's operation of the icon included in the sub-icon.

(13)

The information processing apparatus according to (12), in which the manner of the sound-recording includes a mode of the sound-recording, and the mode includes a mode of sound-recording of only a sound output by the external application and a mode of sound-recording of the sound output by the external application and a sound uttered by a user.

(14)

The information processing apparatus according to any one of (5) to (13), in which the sub-icon includes an icon for a user to issue an instruction to release a recorded moving image to an external service, and the controller dynamically controls the release of the recorded moving image to the external service on the basis of a user's operation of the icon included in the sub-icon.

(15)

The information processing apparatus according to any one of (1) to (14), in which, in the case where the extended menu icon in an edge region of the display window has not been used for more than a predetermined period of time, the controller causes the extended menu icon to move to a position at which at least a part of the extended menu icon hides outside the display window.

(16)

The information processing apparatus according to any one of (1) to (15), in which, in the case where the extended menu icon has not been used for more than a predetermined period of time, the controller controls superimposed-displaying of the extended menu icon such that a degree of highlighting of the extended menu icon decreases.

(17)

The information processing apparatus according to any one of (1) to (16), in which the external application includes a game application.

(18)

An information processing method including:

controlling, by a processor, functional extension of an external application, in which the controlling includes causing an extended menu icon whose display position is adjustable to be superimposed and displayed on a display window of the external application, and controlling a display position of an extended menu according to the display position of the extended menu icon, and causing an extension function icon to be superimposed and displayed on the display window with a display position of the extension function icon being adjustable, the extension function icon being associated with an extension function selected on the extended menu, and controlling a display position of a sub-icon accompanying the extension function icon, according to the display position of the extension function icon.

(19)
A program causing a computer to function as an information processing apparatus,
the information processing apparatus including a controller configured to control functional extension of an external application, in which
the controller is configured to
cause an extended menu icon whose display position is adjustable to be superimposed and displayed on a display window of the external application, and control a display position of an extended menu according to the display position of the extended menu icon, and
cause an extension function icon to be superimposed and displayed on the display window with a display position of the extension function icon being adjustable, the extension function icon being associated with an extension function selected on the extended menu, and control a display position of a sub-icon accompanying the extension function icon, according to the display position of the extension function icon.

REFERENCE SIGNS LIST

10: Information processing apparatus
110: Operation unit
120: Sound input unit
130: Image capturing unit
140: Controller
150: Sound output unit
160: Display unit

The invention claimed is:

1. An information processing apparatus, comprising:
a controller configured to:
cause a function icon to superimpose and display on a display window of an external application, wherein a display position of the function icon is adjustable;
cause a plurality of sub-icons associated with the function icon to superimpose and display adjacent to the function icon on the display window of the external application;
control, based on the display position of the function icon, a display position of each of the plurality of sub-icons, wherein
the plurality of sub-icons is one of turned on or turned off by a touch operation on the function icon
the plurality of sub-icons is automatically hidden while the function icon is moved by a dragging operation on the function icon, and
the plurality of sub-icons is re-displayed on completion of the dragging operation.

2. The information processing apparatus according to claim 1, wherein the controller is further configured to:
cause an extended menu icon to superimpose and display on the display window of the external application; and
control, based on a display position of the extended menu icon and an aspect ratio of the display window, a display position of an extended menu.

3. The information processing apparatus according to claim 2, wherein,
in a case where a side along a height direction of the display window is longer than a side along a width direction of the display window, the controller is further configured to cause the extended menu to superimpose and display in one of an upper region or a lower region of the display window that includes the display position of the extended menu icon, and
in a case where the side along the width direction of the display window is longer than the side along the height direction of the display window, the controller is further configured to cause the extended menu to superimpose and display in one of a left-side region or a right-side region of the display window that includes the display position of the extended menu icon.

4. The information processing apparatus according to claim 2, wherein,
in a case where the extended menu icon in an edge region of the display window is not used for more than a specific period of time, the controller is further configured to cause the extended menu icon to move to a position at which at least a part of the extended menu icon hides outside the display window.

5. The information processing apparatus according to claim 2, wherein,
in a case where the extended menu icon is not used for more than a specific period of time, the controller is further configured to control the display of the extended menu icon with a reduced degree of highlighting.

6. The information processing apparatus according to claim 1, wherein the controller is further configured to change, based on a movement of the function icon, the display position of each of the plurality of sub-icons such that the plurality of sub-icons fits inside the display window.

7. The information processing apparatus according to claim 1, wherein
the plurality of sub-icons includes an icon to issue an instruction to start and end photography by a terminal that displays the display window, and
the controller is further configured to control, based on a user operation of the icon, the photography by the terminal.

8. The information processing apparatus according to claim 1, wherein
the plurality of sub-icons includes an icon for a user to issue an instruction to release a recorded moving image to an external service, and
the controller is further configured to control, based on a user operation of the icon, the release of the recorded moving image to the external service.

9. The information processing apparatus according to claim 1, wherein the external application includes a game application.

10. An information processing method, comprising:
causing a function icon to superimpose and display on a display window of an external application, wherein a display position of the function icon is adjustable;
causing a plurality of sub-icons associated with the function icon to superimpose and display adjacent to the function icon on the display window of the external application;
and
controlling, based on the display position of the function icon, a display position of each of the plurality of sub-icons, wherein
the plurality of sub-icons is one of turned on or turned off by a touch operation on the function icon,
the plurality of sub-icons is automatically hidden while the function icon is moved by a dragging operation on the function icon, and
the plurality of sub-icons is re-displayed on completion of the dragging operation.

11. A non-transitory computer-readable medium having stored thereon, computer-executable instructions which, when executed by a controller, causes the controller to execute operations, the operations comprising:
  causing a function icon to superimpose and display on a display window of an external application, wherein a display position of the function icon is adjustable;
  causing a plurality of sub-icons associated with the function icon to superimpose and display adjacent to the function icon on the display window of the external application;
  and
  controlling, based on the display position of the function icon, a display position of each of the plurality of sub-icons, wherein
    the plurality of sub-icons is one of turned on or turned off by a touch operation on the function icon,
    the plurality of sub-icons is automatically hidden while the function icon is moved by a dragging operation on the function icon, and
    the plurality of sub-icons is re-displayed on completion of the dragging operation.

* * * * *